(12) United States Patent
Mojaver

(10) Patent No.: US 10,348,963 B2
(45) Date of Patent: *Jul. 9, 2019

(54) SUPER RESOLUTION BINARY IMAGING AND TRACKING SYSTEM

(71) Applicant: Epilog Imaging Systems, San Diego, CA (US)

(72) Inventor: Michael Mojaver, Poway, CA (US)

(73) Assignee: Epilog Imaging System, Inc., San Diego, CA (US)

(*) Notice: Subject to any disclaimer, the term of this patent is extended or adjusted under 35 U.S.C. 154(b) by 366 days.

This patent is subject to a terminal disclaimer.

(21) Appl. No.: 14/847,886

(22) Filed: Sep. 8, 2015

(65) Prior Publication Data

US 2016/0028952 A1    Jan. 28, 2016

Related U.S. Application Data

(63) Continuation of application No. 13/236,057, filed on Sep. 19, 2011, now Pat. No. 9,137,433.

(51) Int. Cl.
*H04N 5/232* (2006.01)
*H04N 5/225* (2006.01)

(52) U.S. Cl.
CPC ....... *H04N 5/23238* (2013.01); *H04N 5/2258* (2013.01); *H04N 5/232* (2013.01); *H04N 5/23229* (2013.01)

(58) Field of Classification Search
CPC .. H04N 5/2258; H04N 5/232; H04N 5/23229; H04N 5/23238
See application file for complete search history.

(56) References Cited

U.S. PATENT DOCUMENTS

| | | | | |
|---|---|---|---|---|
| 5,923,466 A | * | 7/1999 | Krause | ............... G01M 11/0264 359/385 |
| H1914 H | | 11/2000 | Watkins | |
| 6,483,609 B1 | * | 11/2002 | Ueno | ....................... H04N 1/41 358/1.2 |

(Continued)

*Primary Examiner* — Md N Haque
(74) *Attorney, Agent, or Firm* — Nelson Mullins Riley & Scarborough LLP; Thomas J. Engellenner; Reza M. Mollaaghababa

(57) ABSTRACT

In one aspect, the invention provides an imaging system including an optical system adapted to receive light from a field of view and direct the received light to two image planes. A fixed image detector is optically coupled to one of the image planes to detect at least a portion of the received light and generate image data corresponding to at least a portion of the field of view. A movable (e.g., rotatable) image detector is optically coupled to the other image plane to sample the received light at different locations thereof to generate another set of image data at a higher resolution than the image data obtained by the fixed detector. The system can include a processor for receiving the two sets of image data to generate two images of the field of view. In some implementations, the processor can employ one of the images (typically the image having a lower resolution) to detect one or more objects of interest (e.g., one or more objects moving within the field of view) and to effect the acquisition of image data corresponding to one or more of those moving objects at a higher resolution (e.g., by controlling the movement of the movable image detector).

20 Claims, 13 Drawing Sheets

(56) References Cited

U.S. PATENT DOCUMENTS

| | | | |
|---|---|---|---|
| 7,294,815 B2* | 11/2007 | Haven | G06F 3/0325 250/203.1 |
| 7,478,754 B2* | 1/2009 | Gurevich | G06K 7/10811 235/454 |
| 2004/0201704 A1 | 10/2004 | Tseng et al. | |
| 2005/0220353 A1 | 10/2005 | Karczewicz et al. | |
| 2006/0261167 A1* | 11/2006 | Ray | G06K 7/10851 235/462.08 |
| 2009/0180020 A1* | 7/2009 | Nayar | G02B 5/205 348/335 |
| 2010/0102239 A1 | 4/2010 | Hahn et al. | |
| 2010/0214468 A1 | 8/2010 | Caron et al. | |
| 2010/0283842 A1* | 11/2010 | Guissin | G02B 13/06 348/68 |
| 2011/0032325 A1* | 2/2011 | Harris | G02B 13/08 348/36 |

* cited by examiner

SUPER RESOLUTION BINARY IMAGING AND TRACKING SYSTEM

CROSS-REFERENCE TO RELATED APPLICATIONS

The present application is a continuation of U.S. patent application Ser. No. 13/236,057, filed Sep. 19, 2011, which is herein incorporated by reference in its entirety.

FIELD

The present invention is generally directed to imaging systems and methods, and more particularly, to such systems and methods that allow imaging of a field of view with two different image planes where one of the image planes has a much higher resolution than the other.

BACKGROUND

Imaging systems are employed in a variety of applications. For example, in surveillance applications, imaging systems can provide still or video images of a field of view, and in some cases, such systems can detect changes in the field of view, e.g., movement of a vehicle, a person, or fire and smoke. Some surveillance imaging systems provide a wide-angle image of a field of view as well as a narrow-angle image of a portion of that field. For example, a fixed-position camera having a wide-angle lens can be employed to acquire the wide-angle image and a pan-tilt-zoom (PTZ) camera can be directed to acquire the narrow-angle image. In some cases, the PTZ camera can be directed to track an object that moves within the field of view, e.g., based on positioning information provided by the wide-angle image.

There is still a need for improved imaging systems. For example, in surveillance applications, it is desirable to obtain images of a tracked object at a much higher resolution than that provided by conventional imaging systems.

SUMMARY

In one aspect, the present invention provides an imaging system, which includes an optical system for receiving light from a field of view, where the optical system directs the received light to a first image plane and a second image plane. For example, the optical system splits the light between two optical paths, one of which leads to the first image plane and the other to the second image plane. By way of example, the optical system can comprise at least one lens for collecting light from the field-of-view and a beam splitter that is optically coupled to the lens for splitting the collected light between the first image plane and the second image plane. In some implementations, the optical system can be configured to compress the light beam directed to at least one of the image planes by a scaling factor, e.g., in a range of about 10× to about 50×. In some implementations, the optical system can include a zoom lens.

The system further includes a first image detector optically coupled to the first image plane to detect at least a portion of the light directed thereto for acquiring first image data corresponding to the field of view at a first resolution (and/or first resolution per unit area), and a second image detector optically and movably coupled to the second image plane. The movable image detector is adapted to move so as to sample (detect) light directed to the second image plane at a plurality of locations in order to acquire second image data corresponding to the field of view at a second resolution (and/or second resolution per unit area) greater than the first resolution (and/or the first resolution per unit area).

In a related aspect, the imaging system further includes a processor in communication with the first and second image detectors so as to receive the first and second image data. The processor processes the first and second image data to generate, respectively, first and second images of the field of view, where the second image exhibits a greater resolution (and/or resolution per unit area) than that of the first image.

Further, the processor can be configured to generate control signals for effecting movement of the second image detector (e.g., its rotation about an axis) to acquire the second image data corresponding to at least a portion of the first image at a resolution (and/or resolution per unit area) that is greater than the resolution (and/or resolution per unit area) exhibited by the first image.

The system can further include a controller that is electrically coupled to the processor to receive the control signals generated by the processor and to effect movement of the second image detector (e.g., via application of electrical signals to an actuator coupled to the second detector) in response to those control signals.

In a related aspect, the processor is configured to analyze the first image data to identify one or more objects of interest, if any, in the field of view and to generate control signals, which can be indicative of the coordinates of the object(s) in the field of view, for communication to the controller. The controller can in turn cause the movement (e.g., rotation) of the second image detector in response to the control signals to acquire the second image data corresponding to at least one of the objects identified in the first image at a higher resolution (and/or resolution per unit area) than a respective resolution (and/or resolution per unit area) exhibited by the first image data.

In a related aspect, the first image detector is configured to capture an image (e.g., a video image) of the field of view, and the processor is configured to analyze the video image to identify one or more objects, if any, moving within the field of view. The processor is further configured to generate control signals indicative of time-varying coordinates of at least one of the moving objects and to communicate those control signals to the controller. The controller can, in turn, effect the movement of the second image detector in response to the control signals so as to track at least one of the moving objects to obtain image data thereof as that object moves within the field of view. The processor receives the image data corresponding to the moving object from the second image detector to generate one or more images of the moving object(s) at a higher resolution (and/or resolution per unit area) than a respective resolution (and/or resolution per unit area) provided by the first image.

In a related aspect, the processor is configured to employ an image recognition algorithm to identify one or more objects of interest. The processor can also be configured to detect the movement of those object(s) within the field of view.

In some embodiments, the controller can include an actuator that is coupled to the second image detector to cause its movement (e.g., its rotation) based on control signals generated by the processor. The controller can also adjust the rate of movement of the movable detector, e.g., by applying suitable signals to the actuator, based on a variety of factors, such as, an image acquisition time of the detector, a desired resolution of the second image, etc.

In the above system, the image planes can take a variety of shapes. For example, in some embodiments the image planes can have a flat geometry. Alternatively, the image planes can be curved.

In a related aspect, the system can include at least one display in communication with the processor for presenting the first and second images to an observer. In some implementations, the system includes two displays, one of which is employed to display the first image and the other is employed to display the second image.

In some embodiments, the processor can effect the presentation of a graphical object in a display adapted to display the first image so as to delineate a portion of the first image that is presented in the other display as the second image.

The system can further include a user interface module that is in communication with the processor, e.g., for receiving user commands. By way of example, the user interface module can be adapted to receive user commands that are indicative of a portion of the first image to be generated as the second image, a desired resolution for the second image, etc. The user interface module can communicate information associated with the user command to the processor. The processor can in turn issue suitable control signals, e.g., for effecting the movement of the movable detector, in response to the received user commands.

As noted above, in many embodiments, the resolution (and/or resolution per unit area) of the image constructed based on the image data gathered by the movable image detector (the second image) is greater (and in many cases significantly greater) than that exhibited by the image constructed based on the image data gathered by the fixed image detector (the first image). By way of example, the second image can exhibit a resolution that is at least about 10 times, or at least about 100 times, or at least about 1000 times greater than the resolution exhibited by the first image. In some implementations, the first image exhibits a diffraction limited resolution based on optical diffraction characteristics of the optical system, while the second image exhibits a resolution that is double or triple that of the first image. For example, the first image can exhibit a resolution per unit area in a range of about 20 megapixel to about 50 megapixels per square inch, and the second image can exhibit a resolution per unit area in the range of about 50 to about 100 megapixels per square inch of image plane area. The second image can have an effective resolution on the order of gigapixels or more. In other words, the resolution of the second image can be comparable to the resolution of a similar-sized image obtained by a hypothetical stationary detector having $10^9$ or more image detecting elements.

The movable image detector can be implemented in a variety of ways. By way of example, the image detector can include one or more image detection element(s) that are mounted on a rotatable platform, e.g., a platform that is rotatable about an optical axis of the optical system. In some implementations, the platform has a substantially circular shape and the second image detector comprises an array of image detecting elements that are disposed radially on the platform.

The first and the second image detectors can be implemented by using a variety of image detection technologies. For example, the first and the second image detectors can comprise any of CCD elements, CMOS elements, thermal imaging detection elements, etc., or any mix of these elements.

In some embodiments, the optical system of the imaging system can include a wide-angle lens, e.g., a fisheye lens, for directing light emanating from a wide field-of-view to the first image plane to be detected by the first image detector (i.e., the image detector fixedly coupled to the first image plane). In such embodiments, the processor can be configured to correct distortions in the image data acquired by the first image detector to generate an undistorted image of the wide field-of-view.

In some embodiments, the processor is configured to automatically generate a plurality of second images corresponding to different portions of the first image according to a predefined pattern. For example, the processor can execute a set of predefined instructions to choose different portions of the field of view presented in the first image according to a pattern, and to instruct the movable image detector (the second image detector) to obtain images of those portions at a higher resolution (and/or resolution per unit area) than that exhibited by the first image.

In another aspect, an imaging system is disclosed, which includes an image capture system for receiving light from a field of view and splitting the light between a first image plane and a second image plane. A first image detector is optically coupled to the first image plane to acquire first image data of the field of view, and a second image detector is mounted on a movable platform and is optically coupled to the second image plane to acquire second image data of the field of view. The system can further include a processor that is adapted to generate control signals for application to the platform to cause movement (rotation) thereof such that the second image detector moves so as to acquire the second image data at a resolution (and/or resolution per unit area) greater than a resolution exhibited by the first image data. In some embodiments, the image capture system can comprise a wide-angle lens for collecting light from a wide field of view.

In a related aspect, the system includes a controller electrically coupled to the processor and to the platform, where the controller effects the movement (e.g., rotation) of the platform in response to the control signals. In many embodiments, the controller can include an actuator that is coupled to the platform to cause its movement based on the control signals. In some implementations, the movable platform is rotatable about an axis and the controller causes the platform to rotate based on the control signals to allow the second image detector to acquire image data corresponding to different portions of the field of view. The controller can further adjust the rotational velocity of the platform based on control signals received from the processor.

In the above system, the processor can be in communication with the first and second image detectors so as to receive the first and second image data. The processor can process the first and second image data to generate, respectively, first and second images of the field of view. In many implementations, the second image exhibits a greater resolution (and/or resolution per unit area) than that exhibited by the first image. The processor can also analyze the first image to identify one or more objects of interest, if any, in the field of view and generate control signals indicative of coordinates of said one or more objects for communication to the controller.

The controller can in turn cause the movement of the movable (second) image detector in response to the control signals indicative of the coordinates of said one or more objects to acquire the second image data corresponding to at least one of those objects at a greater resolution than a respective resolution provided by the first image.

In some embodiments, in the above system, the first image detector is configured to capture a video image of the field of view, and the processor is configured to analyze the video image to identify one or more objects, if any, moving within the field of view. The processor can be configured to generate control signals indicative of time-varying coordinates of at least one of the moving objects and communicate the control signals to the controller. The controller can in turn effect the movement of the platform, and consequently that of the second image detector, in response to the control signals so as to acquire image data of at least one of the moving objects, e.g., at video rates, as it tracks that object within the field of view. The processor can receive the image data acquired by the second image detector to generate a video image of the moving object at a greater resolution (and/or resolution per unit area) than a respective resolution (and/or resolution per unit area) exhibited by the first image.

In other aspects, an imaging method is disclosed that includes capturing light emanating from a field of view and directing the received light to a first image plane and a second image plane. A first image detector that is optically coupled to the first image plane is utilized to acquire first image data of the field of view. A second image detector that is optically coupled to the second image plane is moved so as to acquire second image data of the field of view at a plurality of image points at a resolution (and/or resolution per unit area) greater than a resolution (and/or resolution per unit area) provided by the first image data. As discussed above, both image detectors can be implemented in a variety of ways. For example, in some implementations, the step of directing the captured light to the first and second image detectors can include concurrently directing the captured light to the first and second image detectors, e.g., by employing a beam splitter.

In a related aspect, in the above method, the first and second image data are employed to generate, respectively, first and second images of the field of view. The first image can be employed to track coordinates of at least one moving object, if any, within the field of view. The second image detector can then be moved (e.g., rotated) based on the coordinates of the moving object so as to obtain image data of that object (e.g., typically at a greater resolution than that provided by the first image) as it moves within the field of view. In some implementations, the second image detector can generate a video image of the moving object at a higher resolution (and/or resolution per unit area) as that object moves within the field of view. In some cases, the second image exhibits a resolution per unit area of at least about 50 megapixels per square inch of image plane area, e.g., a resolution per unit area in a range of about 50 megapixels per square inch of image plane area to about 100 megapixels per square inch of image plane area. In some embodiments, the second image exhibits an effective resolution on the order of gigapixels or more.

In another aspect, an optical tracking system is disclosed that includes an optical system for receiving light from a field of view and for directing the received light to a first image plane and a second image plane. The system further includes a first image detector that is optically coupled to the first image plane to acquire first image data of the field of view, and a second image detector that is mounted on a movable platform and is optically coupled to the second image plane to acquire second image data of the field of view. A processor that is in communication with the image detectors and the platform can analyze the first image data to identify at least one moving object, if any, in the field of view and can apply control signals indicative of the coordinates of the moving object to the platform to cause movement thereof such that the second image detector acquires image data of the moving object at a greater resolution (and/or resolution per unit area) than a resolution (and/or resolution per unit area) provided by the first image data.

In a related aspect, in the above system, the processor derives the coordinates of the moving object from analyzing the image data obtained by the first image detector and updates the control signals indicative of those coordinates as the object moves in the field of view.

In some embodiments of the above tracking system, the second image data corresponding to the moving object exhibits a resolution (and/or resolution per unit area) that is greater than (e.g., double or triple) a diffraction limited resolution (and/or resolution per unit area) based on optical diffraction characteristics of the optical system. In some cases, the second image data can be utilized to construct the second image, e.g., a video image, of the moving object at a resolution per unit area of at least about 100 megapixels per square inch.

In another aspect, an imaging system is disclosed that includes an optical system for receiving light from a field of view, where the optical system directs the received light to a first image plane and a second image plane. The system further includes a first image detector optically coupled to the first image plane to detect at least a portion of the light directed thereto for acquiring first image data corresponding to the field of view at a first resolution (and/or a first resolution per unit area), and a second image detector that is optically coupled to the second image plane for acquiring second image data corresponding to the field of view. The optical system further includes at least one reflective optical element (e.g., a pivoting mirror) that is configured to direct (e.g., scan) light emanating from different portions of the field of view to the second image detector to allow the second image detector to detect light emanating from a plurality of locations in the field of view so as to acquire second image data, e.g., at a second resolution (and/or resolution per unit area) greater than the first resolution (and/or the first resolution per unit area).

In a related aspect, the above system can include a processor in communication with the first and second image detectors so as to receive the first and second image data. The processor can process the first and second image data to generate, respectively, first and second images of the field of view. In many embodiments, the second image exhibits a resolution (and/or resolution per unit area) that is greater than that of the first image.

The processor can be configured to generate control signals for effecting the movement of the reflective optical element (e.g., one or more pivoting mirrors) to acquire the second image data corresponding to at least a portion of the first image at a resolution (and/or resolution per unit area) greater than a resolution (and/or resolution per unit area) provided by the first image. By way of example, the system can include a controller electrically coupled to the processor and the reflective optical element to cause the movement (e.g., rotation) of the reflective element in response to the control signals generated by the processor. In some embodiments, the controller can include an actuator coupled to the reflective element to cause its movement based on the control signals. The system can also include one or more displays for displaying the first and second images. Further, the system can include a user interface module in communication with the processor, which can receive commands from a user and transmit those commands to the processor. By way of example, the user interface module can be adapted to receive a user command indicative of a portion of the first image to be generated as the second image, e.g., at a greater resolution (and/or resolution per unit area) than that provided by the first image.

In another aspect of the invention, an image detector for use in an imaging system is disclosed. The detector includes a plurality of image detector elements and at least one movable platform configured to move within an image plane. The image detector elements are affixed to the movable platform such that the elements can image any area of the image plane by moving the platform to position the elements correctly. In some embodiments, an actuator may be provided to effect the movement of the platform. A controller may also be connected to the actuator to control its operation and thereby control the movement of the platform or platforms. In some embodiments, the movable platform may be configured to rotate within the image plane. By way of example, image detector elements may be affixed to the rotating platform along at least one radial line extending from the platform's center to its edge. In certain other embodiments, the at least one movable platform may be configured to translate in two dimensions within the image plane rather than rotate. In such a case, a single movable platform may be configured to translate across the image plane, or a plurality of movable platforms may be configured to translate across sections of the image plane.

BRIEF DESCRIPTION OF THE DRAWINGS

The invention will be more fully understood from the following detailed description taken in conjunction with the accompanying drawings, in which like numerals are used to refer to like elements.

DETAILED DESCRIPTION

Figure 1:
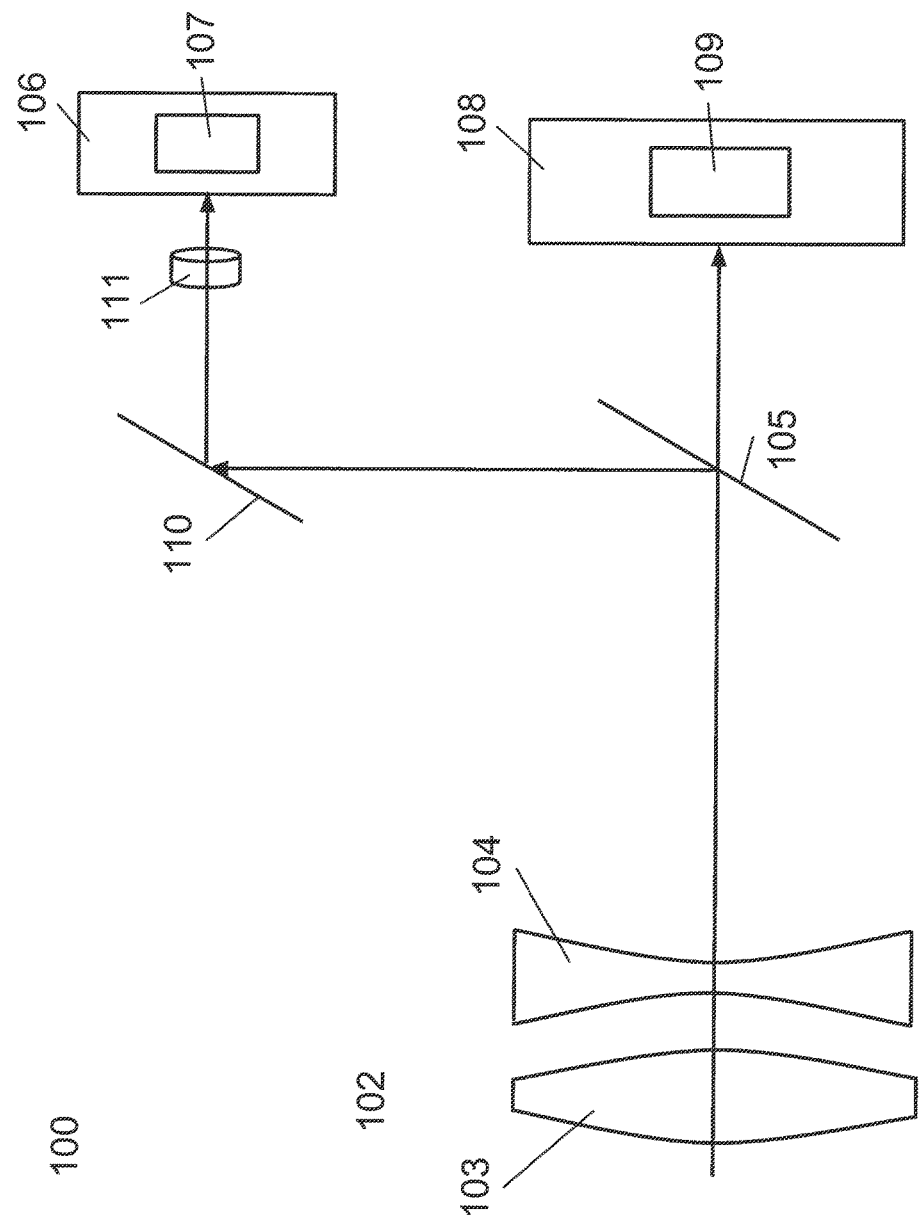
FIG. 1 is a schematic representation of an exemplary embodiment of an imaging system according to the teachings of the present invention.

Certain exemplary embodiments will now be described to provide an overall understanding of the principles of the methods and systems disclosed herein. One or more examples of these embodiments are illustrated in the accompanying drawings. The methods and systems specifically described herein and illustrated in the accompanying drawings are non-limiting exemplary embodiments and that the scope of the present invention is defined by the claims. The features illustrated or described in connection with one exemplary embodiment may be combined with the features of other embodiments. Such modifications and variations are intended to be included within the scope of the present invention.

The present invention generally provides systems and methods for obtaining still or video images of a field of view, and displaying high resolution images of at least a portion of the field of view while presenting information regarding the context of that portion within the field of view. In many embodiments, the systems and methods of the present invention advantageously allow the simultaneous and rapid generation of high resolution images corresponding to different portions of the field of view. Such rapid generation of the high resolution images can be suited for a variety of applications, and in particular, for object tracking applications in which high resolution images of one or more objects are generated as those object(s) move within the field of view. The term "resolution" is used herein consistent with its common usage in the art, and particularly in the field of digital imaging, to refer to the number of light sensitive pixels in an image. The term "resolution per unit area" is used herein to refer to the number of light sensitive pixels in a unit area of an image, e.g., the number of pixels per square inch of the image. As an example, 35 mm film used in professional photography has an effective resolution of approximately 20 megapixels per frame when coupled with high quality diffraction limited optics.

In many embodiments, a system according to the teachings of the invention can operate by directing light from a field of view onto two or more image planes that are optically coupled to two or more image detectors. In some embodiments, by configuring one image detector to capture light from a wide-angle portion of the field of view and the other to be movable so as to capture light from different narrow-angle portions of the field of view, a wide-angle image of the field of view as well as one or more enhanced still or video images of one or more portions of the field of view can be created. For example, as discussed in more detail below, in some embodiments, one or more image detectors fixedly coupled to one of the image planes can provide an image of the field of view. The image of the field of view can be analyzed (e.g., to detect one or more objects of interest) to generate control signals for application to the movable detector to cause the movable detector to scan across one or more selected portions of its respective image plane to generate still or video images of those portions of the field of view at a higher resolution (and/or resolution per unit area) than that provided by the fixed image detectors.

The term "image plane" is known in the art. To the extent that any further explanation may be needed, the term "image plane" can refer to a plane on which the image of at least a portion of the field of view is formed, e.g., the surface of a detector. While in some embodiments the image plane can be flat, in other embodiments it can be curved.

Figure 2:
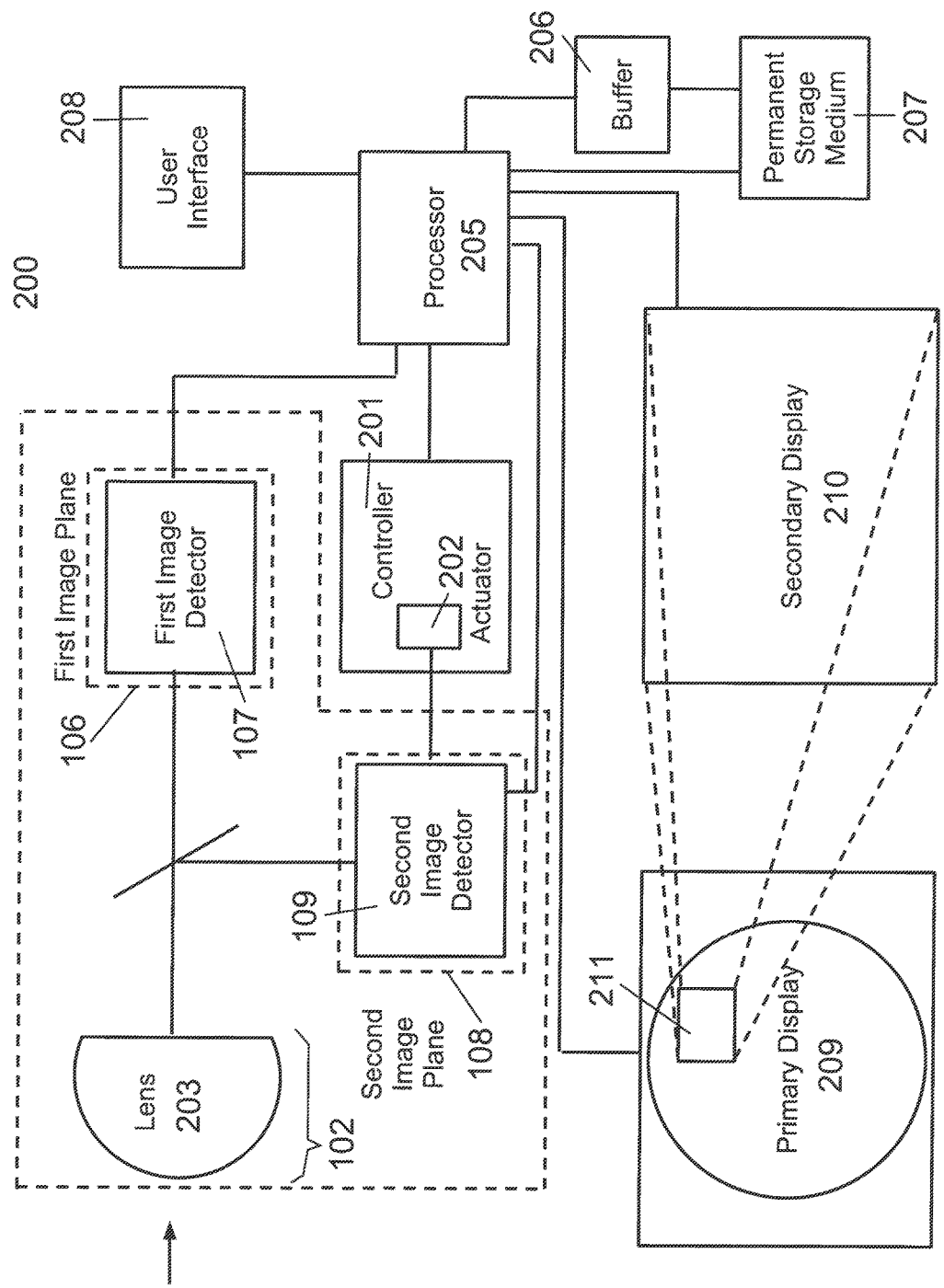
FIG. 2 is a second diagram of an exemplary embodiment of an imaging system according to the teachings of the present invention.

With reference to FIGS. 1 and 2, an exemplary imaging system 100 according to an embodiment of the invention includes an optical system 102 for collecting light from a field of view. In the implementation illustrated in FIG. 1, the optical system 102 includes a converging lens 103 and a diverging lens 104 that in combination direct the collected light onto a beam splitter 105. More particularly, in this implementation, the converging lens 103 and the diverging lens 104 collectively collimate the light received from a field of view and direct the collimated light to the beam splitter 105.

The beam splitter 105 reflects a portion of the light incident thereon to a first image plane 106 and allows another portion of the incident light to pass therethrough to be directed to a second image plane 108. By way of example, the beam splitter can be a 50:50 splitter, which directs half of the incident light intensity to each image plane. In other cases, the beam splitter can divide the incident light unevenly between the first and the second image planes. For example, the beam splitter can be a 80:20 splitter. In this implementation, a mirror 110 receives the light reflected by the beam splitter 105 and reflects that light onto a focusing lens 111 which, in turn, converges the light onto the first image plane 106. In certain embodiments, the focusing lens 111 can be configured to scale down the image such that the entire field of view can be captured by a first image detector 107 that is optically coupled to the first image plane 106.

Though not shown in this embodiment, one or more optical elements (e.g., one or more focusing lenses) can also be optionally disposed between the beam splitter 105 and the second image plane 108. By way of example, such optical elements can be utilized to converge, or alternatively expand, the light that passes through the beam splitter 105 before it reaches the second image plane 108.

The first image detector 107 optically coupled to the first image plane 106 can detect at least a portion of the light that is directed to the first image plane to acquire first image data of the field of view, or at least a portion thereof. A second image detector 109 is optically and movably coupled to the second image plane 108. The second image detector 109 can move so as to detect light directed to the second image plane 108 at a plurality of locations so as to acquire second image data of the field of view, or at least a portion thereof. As discussed in more detail below, in many embodiments, the image data acquired by the second image detector 109 can be processed to construct a higher resolution image than the image constructed based on the image data acquired by the first image detector 107.

Though not illustrated in this embodiment, the exemplary system 100 can further include additional secondary image planes and detectors (e.g., a third image plane and third image detector) to which light emanating from the field of view can be directed, e.g., via additional beam splitters or other optical systems. By way of example, such configurations allow for multiple higher resolution images to be created simultaneously from different portions of the field of view.

With reference to FIG. 2, in one implementation of the imaging system 100, an imaging system 200 can include a controller 201 that is coupled to the second image detector 109, which is optically and movably coupled to the second image plane 108. As discussed in more detail below, the controller is configured to effect the movement (e.g., rotation) of the second image detector, e.g., within the second image plane, to sample light at different locations of the image plane so as to acquire image data.

The controller 201 can include an actuator 202 that converts electrical signals generated by the controller into mechanical movement of the second image detector.

The exemplary imaging system 200 can also include a processor 205 that is electrically coupled to the first image detector 107, the second image detector 109, and the controller 201. The processor 205 is configured to collect image data acquired by the first and the second image detectors, process the collected image data to construct resulting first and second images, and control the movement of the second image detector via the controller 201. For example, as discussed in more detail below, the processor can form an image of the field of view based on the image data acquired by the first image detector and can analyze that image to identify one or more objects of interest, if any, in the field of view. The processor can then generate control signals indicative of the coordinates of that object within the field of view and can communicate control signals indicative of those coordinates to the controller 201.

By way of example, in use, the processor 205 can be configured to select a portion of the field of view captured by the image data acquired by the first image detector. The processor 205 can then instruct the controller 201 to move (e.g., scan) the second image detector 109 over an area of the second image plane corresponding to the selected portion of the field of view so as to acquire image data at a higher resolution. The processor 205 can then collect second image data from the second image detector 109 as it scans the selected portion of the field of view. Finally, the processor 205 can use the collected second image data to construct an image of the selected portion of the field of view at a higher resolution (and/or resolution per unit area) than the image constructed from the first image data. For example, the image of the selected portion generated based on the image data acquired by the second image detector can exhibit a resolution that is at least about 2 times, or at least about 10 times, or at least about 1000 times, greater than the corresponding resolution provided by the image generated based on the image data acquired by the first image detector.

The exemplary system 200 can further include a buffer 206 that can be utilized, e.g., for temporary storage of the image data acquired by the first and the second image detectors. The processor can communicate with the buffer to store image data therein or to retrieve image data therefrom. In some cases, each of the first and second image detectors includes an integrated buffer for temporary storage of the image data acquired by that image detector.

Processor 205 can also be connected to a primary display 209 and a secondary display 210 to send data corresponding to the first and second images, respectively, thereto so that those images can be displayed. In some cases, the processor can effect the display of a graphical element, such as a call-out box, in the first display that highlights the portion of the first image reproduced as the second image at a higher resolution and displayed in the secondary display 210. The term "display," as used herein, can refer to a device, such as a computer monitor or a television monitor, that allows visual presentation of data, e.g., images, and it can also refer to at least a portion of a screen provided by such a device for viewing images. For example, a display can refer to a computer monitor or a window provided on a computer screen.

While in many embodiments the first image and the second higher-resolution image can be presented in separate physical displays, in some embodiments, the higher-resolution image can be presented as an overlay on a respective portion of the first image.

Figure 6A:
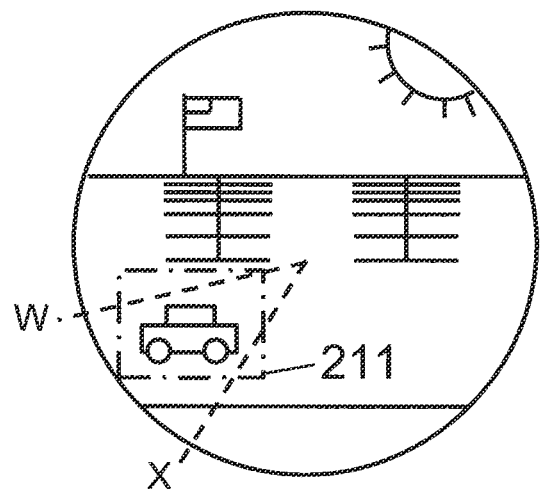
FIG. 6A is a schematic illustration of an exemplary first image plane showing an object of interest that can be imaged using the teachings of the present invention.
Figure 6B:
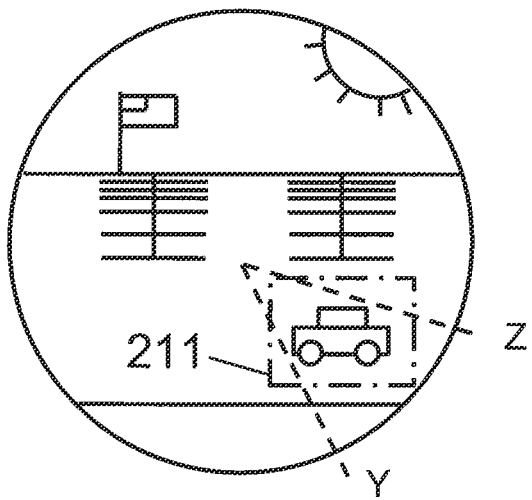
FIG. 6B is a schematic illustration of an exemplary first image plane showing movement in the object of interest that can be tracked using the teachings of the present invention.

As shown schematically in FIGS. 2, 6A, and 6B, a graphical object, such as a call-box 211, can delineate the contours of the first image that is generated as the second image. In some embodiments, the first and the second images can be displayed in separate software-generated windows on a single physical display.

Alternatively or in addition, first and second image data, or the resulting first and second images, can be stored on a permanent storage medium 207 for later review. In such a configuration, processor 205 can be in communication with the storage medium 207 to effect the transfer of the image data as well as the constructed images to the storage medium and to effect their retrieval, when desired, for further processing or display. Further, a hybrid system may also be created that both displays and saves image data for later retrieval and review.

With continued reference to FIG. 2, in this exemplary implementation, the imaging system can further include a user interface module 208 connected to a processor 205 that allows a user to control the imaging system. User interface module 208 can include any interface hardware known in the art including, for example, a mouse, keyboard, stylus, trackpad, or other input devices. In some embodiments, these input devices can be used in combination with the primary and secondary displays 209, 210 to allow a user to select a portion of the field of view displayed in the first image to be sampled by the movable detector for generating the second image. In such embodiments, the interface module 208 can then communicate the user's selection to the processor 205, which in turn can signal controller 201 to cause the second image detector 109 to move over the designated area of the second image plane 108 to capture second image data.

Figure 3:
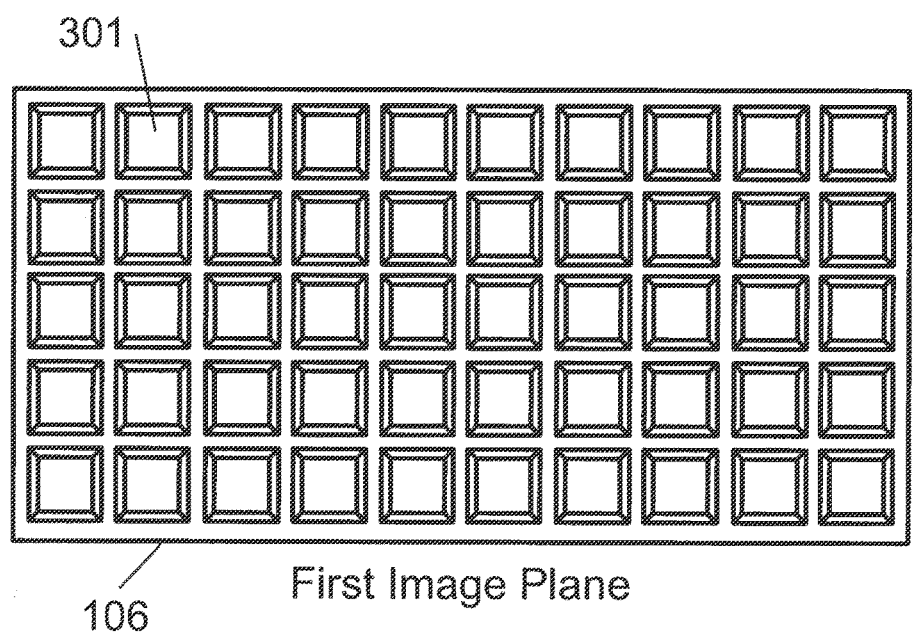
FIG. 3 is a front schematic view of an exemplary embodiment of a first image detector having a fixed array of image detecting elements.

The first and the second image detectors can be implemented in a variety of ways. By way of example, as shown schematically in FIG. 3, the first image detector can be implemented as a plurality of image detecting elements 301 (e.g., a charge-coupled device (CCD) array) that are fixedly coupled to the first image plane 106. In this implementation, the image detecting elements 301 are arranged as a square matrix to capture and detect the light directed to the first image plane. The density of the image detecting elements 301 (i.e., the number of image detecting elements per unit area of the image plane) can vary based, e.g., on the type of application(s) for which the imaging system is intended, the type of image detecting elements, etc. The image detecting elements can be configured in a manner known in the art to communicate with the processor 205 to transmit the acquired image data thereto. In some implementations, the image detecting elements are configured such that the first image constructed based on image data acquired by those elements would exhibit a resolution per unit area greater than about 1 megapixel per square inch, e.g., in a range of about 1 megapixel to about 20 megapixels per square inch.

The movable image detector can also be implemented in a variety of ways. By way of example, FIGS. 4A, 4B, 4C, and 5 illustrate an exemplary implementation of the second (movable) image detector 109, which is optically and movably coupled to the second image plane 108, as a plurality of image detecting elements 401 that are mounted on a rotatable platform 402. The platform is configured to be rotatable about an axis A, which can be, for example, parallel to the direction of the central ray of the bundle of light rays directed to the second image plane. The image detecting elements 401 can be arranged on the rotatable platform 402 according to a variety of layouts. In this exemplary embodiment, the image detecting elements 401 are disposed on the rotatable platform along a radial direction (R) extending from the center of the rotatable platform 402 to the periphery thereof. In such a configuration, as the platform rotates the line of the image detecting elements sweeps across the second image plane with each image detecting element sampling light at different locations. In this manner, the image detecting elements 401 can acquire image data corresponding to at least a portion of the field of view. The controller 201 can control the rotation of the platform so as to allow the image detecting elements 401 to acquire image data corresponding to a selected portion of the field of view (e.g., a portion identified in the first image, as discussed above).

Figure 4A:
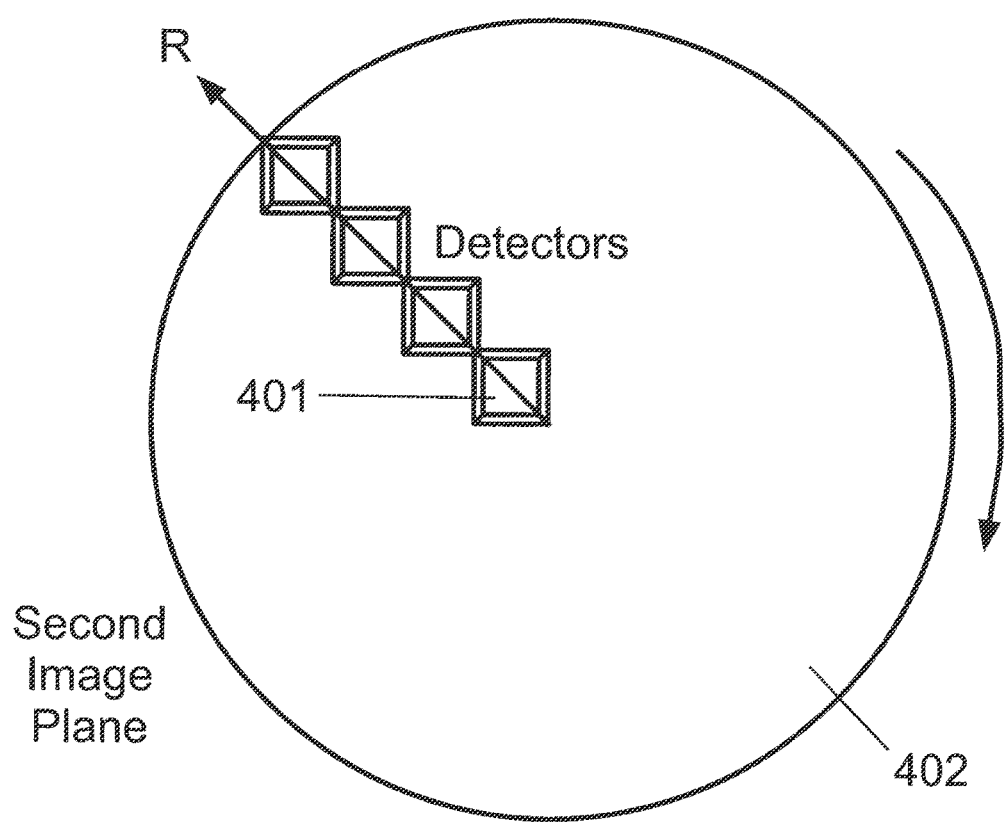
FIG. 4A is a front schematic view of an exemplary embodiment of a second image detector configured to rotate an array of image detecting elements to move them in a second image plane.
Figure 4B:
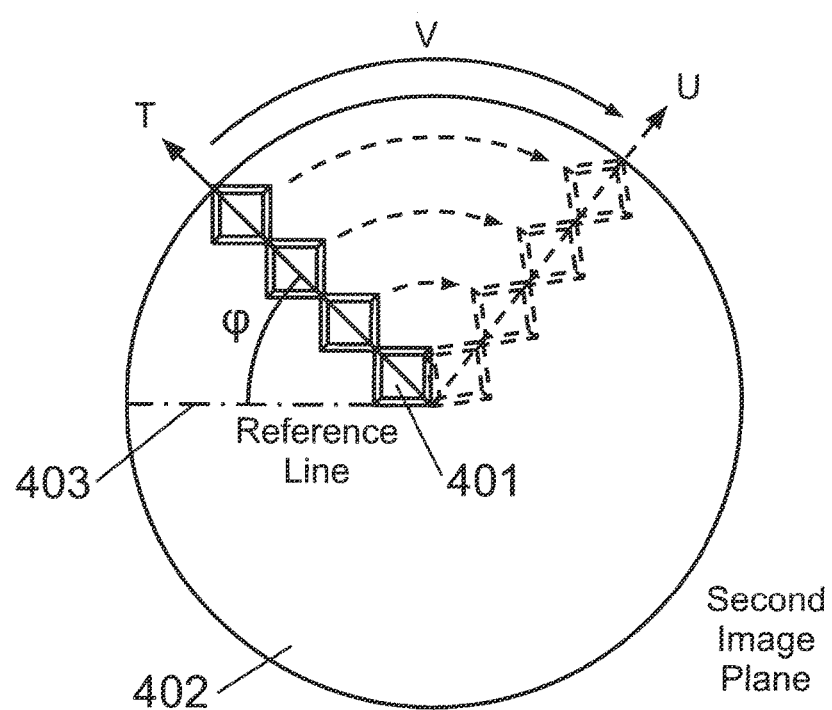
FIG. 4B depicts schematically the rotational movement of the exemplary second image detector illustrated in FIG. 4A.
Figure 4C:
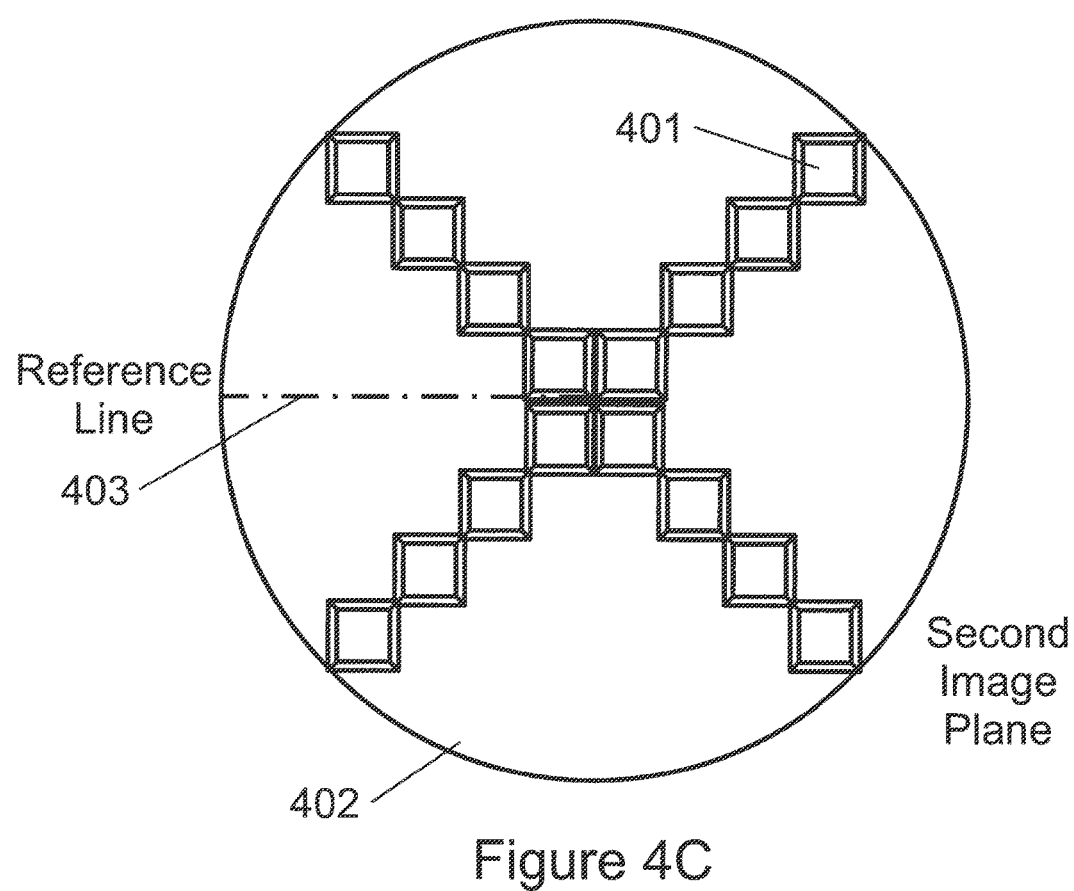
FIG. 4C depicts schematically a front view of an alternative exemplary embodiment of a second image detector configured to rotate multiple arrays of image detecting elements to move them in a second image plane.

By way of example, as shown schematically in FIG. 4B, the controller 201 can control the rotation of the platform 402 such that the line of the image detecting elements scans back-and-forth across a slice of the second image plane delimited by radial lines T and U and arc V. In this manner, image data corresponding to that slice of the field of view can be obtained. The controller can cause the rotatable platform 402 to move in very small and precise increments—increments even smaller than the unit size of the image detecting elements 401. As a result of these "sub-pixel displacements," image data captured by the second image detector 109 will contain overlapping portions of the field of view. The processor 205 can use this overlapping data coverage to create a high resolution image of the selected portion of the field of view. The process of combining multiple slightly-displaced lower resolution images into a higher resolution image is called "super-resolution imaging." More information on super-resolution imaging is available in "Limits on Super-Resolution and How to Break Them," by Simon Baker and Takeo Kanade, IEEE Transaction on Pattern Analysis and Machine Intelligence, Vol. 24, No. 9, September 2002, which is hereby incorporated by reference in its entirety.

Figure 5:
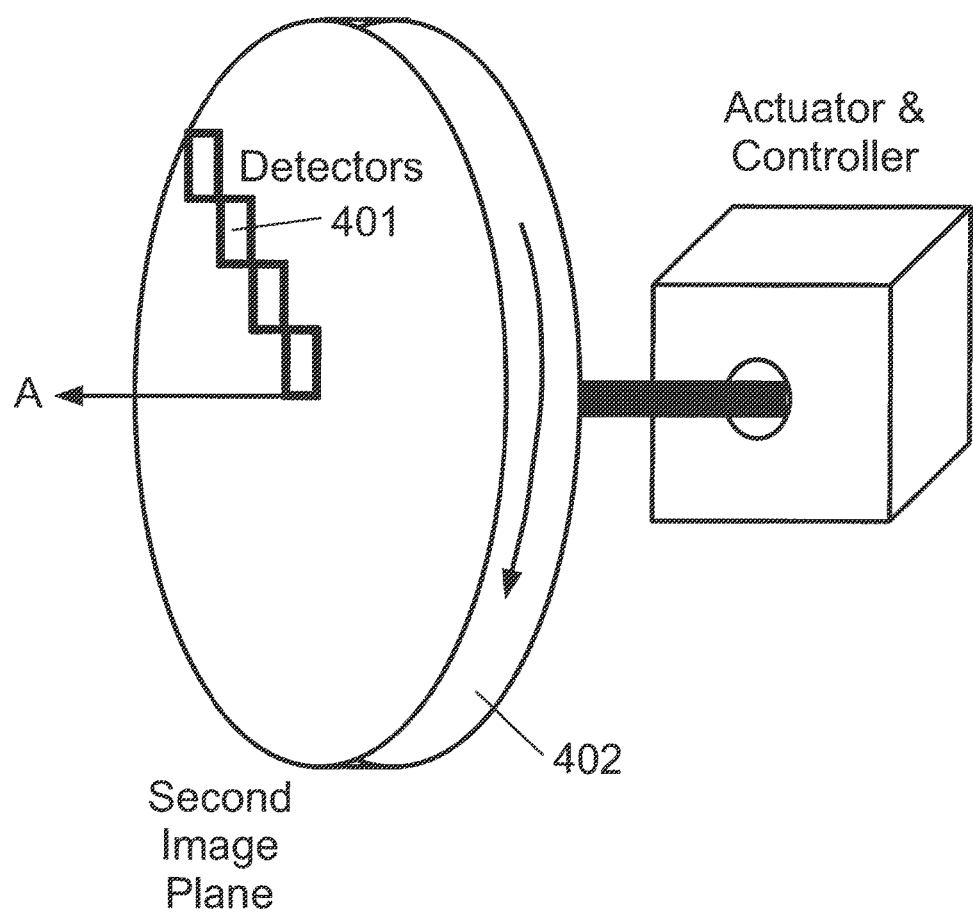
FIG. 5 is a schematic perspective view of the exemplary second image detector of FIG. 4A, showing its connection to exemplary embodiment of an actuator and/or controller.

FIG. 5 illustrates the second image detector from a perspective view, showing its attachment to the controller and actuator illustrated in FIG. 2. As illustrated, actuator 202 is configured to rotate the rotatable platform 402 in response to commands from the controller 201 and processor 205. The actuator 202 can be configured to rotate the platform clockwise, counter-clockwise or both, and, in an exemplary embodiment, is capable of quickly and precisely rotating the platform to allow rapid sampling of various areas in the second image plane.

Similar to the image detecting elements forming the first image detector, the image detecting elements forming the second image detector can also be configured to communicate with the processor 205, e.g., via the controller 201, to transmit the acquired image data thereto. Further, as the acquired image data is transmitted to the processor 205, the controller 201 can provide the processor with information regarding the correspondence between the transmitted image data and the position of the image detecting elements (e.g., rotational position of those elements) at which that data was collected. For example, with reference to FIG. 4B, in this implementation, the instantaneous rotational position of the image detector elements can be characterized by an angle (φ) of the radial line T along which the image detecting elements 401 are disposed relative to a radial reference line 403. The processor can employ this information together with the image data acquired by the second image detector to construct an image of a portion of the field of view.

In this implementation, the linear density of the image detecting elements (i.e., the number of detecting elements per unit radial length) can be selected based on a variety of factors, such as a desired resolution for the second image, the physical constraints of the imaging system, cost, power consumption, etc. For example, in some implementations, 10 mm image detecting elements are disposed along a radial extent of about 40 mm. Further, the rate of rotation of the platform can be selected based on a variety of factors, e.g., a desired resolution for the second image, the data acquisition time associated with the detecting elements, the size of the image detecting elements, etc. For example, for a desired resolution, the platform can be rotated faster as the acquisition time exhibited by the image detecting elements becomes shorter.

The rotation of the image detecting elements advantageously allows obtaining image data at a significantly higher resolution than is currently economically feasible by using a single detecting element or a mosaic or array of fixed-position image detecting elements. In some embodiments, an effective resolution that is greater than the diffraction-limited resolution can be achieved. For example, using the teachings of the invention, an effective resolution that is double or even triple the diffraction limited resolution can be achieved, e.g., an effective resolution per unit area of about 50 to about 100 megapixels per square inch. Accordingly, in some embodiments, systems of the present invention can create images having an effective resolution on the order of a gigapixel over the entire image plane. The term "effective resolution," as used herein, refers to a resolution that an equivalent monolithic stationary 2-dimensional sensor would have. As an example, a sensor having 20,000 by 20,000 pixels can have an effective resolution of 400 megapixels.

A variety of different types of image detecting elements can be used to form the first and the second image detectors. By way of example, such an image detecting element can be, without limitation, a Charge-Coupled Device (CCD) or a Complementary Metal-Oxide Semiconductor (CMOS), Thermal Imaging device, or other imagers known in the art and suitable for use in the present invention.

The image detecting elements 401 can be disposed on the rotatable platform 402 according to a variety of different layouts depending, e.g., on a particular application, a desired effective resolution, cost, or other constraints. For example, as discussed above, the image detecting elements 401 can be laid out in the radial direction covering the entire radius (or diameter) of the rotatable platform 402. Alternatively, multiple lines of image detecting elements 401 can be placed at various angles (e.g., dividing the rotatable platform into thirds, quarters, fifths, etc.), as shown schematically in FIG. 4C. The introduction of additional image detecting elements 401 can reduce the amount of rotation necessary to sample a given portion of the second image plane 108 and may also allow for simultaneous sampling of different portions of the second image plane (e.g., the upper left and lower right corners of the plane in a configuration having image detector elements spanning the entire diameter of the rotatable platform).

Figure 4D:
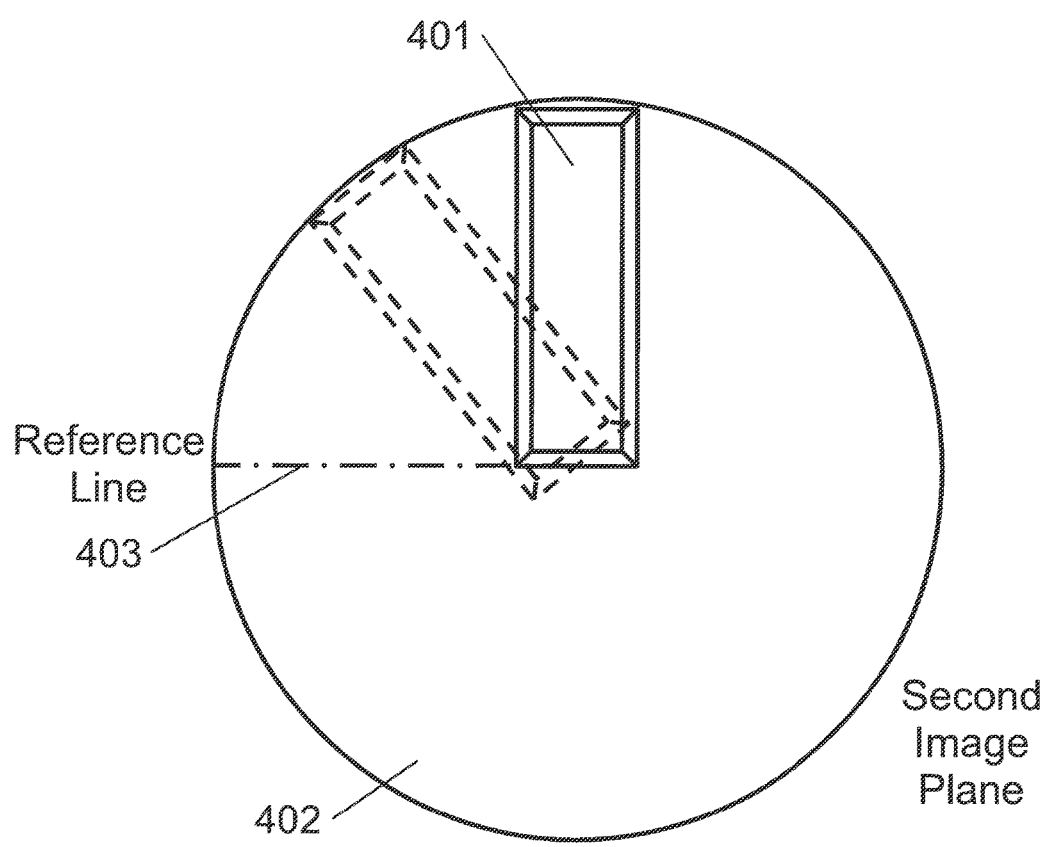
FIG. 4D depicts schematically a front view of another alternative exemplary embodiment of a second image detector in which a single image detecting element is configured to rotate within a second image plane.

In addition, certain embodiments may make use of only a single image detecting element 401 mounted on the rotatable platform 402. Such a configuration is illustrated schematically in FIG. 4D. Even with only a single image detecting element 401, for example a single 10 megapixel CCD, an order of magnitude increase in resolution and a doubling of the field of view is possible from the movement of the image detecting element within the image plane.

Referring again to FIG. 2, in use, in some implementations the first image detector 107 acquires image data by detecting light collected from a field of view via the optical system 102. In some implementations, the optical system 102 can include a wide-angle lens (e.g., lens 203 can be such a wide-angle lens) that can capture light from a scene within a selected field of view. By way of example, the wide-angle lens can be a fisheye lens that can capture light from a 180-degree field of view and direct that light to the first image detector. The first image detector (which can typically include a plurality of image detecting elements) converts the optical photons incident thereon into electrical signals in a manner known in the art. In some implementations, these electrical signals can be stored under the control of the processor in the buffer 206. The processor can then retrieve the stored image data from the buffer 206 and operate on the image data in a manner known in the art to form a first image of the scene. In embodiments in which a wide-angle lens is employed, the processor can optionally correct for geometrical distortions of the image data by employing a number of different algorithms known in the art. By way of example, the teachings of U.S. Pat. No. 6,833,843 entitled "Panoramic Imaging and Display System with Canonical Magnifier," and U.S. Pat. No. 7,750,936 entitled "Immersive Surveillance System Interface," which are herein incorporated by reference in their entirety, can be employed to correct the geometrical distortions of the wide-angle first image. In other cases in which a wide-angle lens is not utilized, such corrections may not be needed.

In some implementations, the processor can analyze the first image to detect one or more objects of interest. Alternatively, the processor can be configured to detect changes in one or more objects of interest from, for example, motion of the object. The processor can utilize well-known image recognition algorithms for detecting the objects. By way of example, when the imaging system is utilized in surveillance applications, the processor can be configured, e.g., via loading appropriate software, to detect human beings, vehicles, or any other object of interest. A variety of image recognition algorithms can be employed. For example, U.S. Pat. No. 6,301,396 entitled "Nonfeedback-based Machine Vision Methods for Determining a Calibration Relationship Between a Camera and a Moveable Object," and U.S. Pat. No. 5,974,169 entitled "Machine Vision Methods for Determining Characteristics of an Object Using Boundary Points and Bounding Regions," disclose examples of such image recognition algorithms. Both of these patents are herein incorporated by reference in their entirety. Further, well-known image processing techniques can be employed to detect the motion of an object within a field of view. For example, successive image frames can be compared with one another to identify one or more objects, if any, that have moved within the field of view. By way of example, the teachings of U.S. Pat. No. 6,734,911 entitled "Tracking Camera Using a Lens that Generates Both Wide-Angle and Narrow-Angle Views," which is herein incorporated by reference in its entirety, can be employed to track moving objects within a field of view. As an example, the object tracking algorithm can first determine movement by differencing a series of sequential images and determine edge boundaries for moving objects, a process referred to as segmentation in the art. From these boundaries motion vectors can be estimated for each object. To improve accuracy for the object size and velocity estimates, a predictive Kalman-type filter is often utilized to calculate best estimate probabilistic predictions for objects being tracked. This type of object tracking algorithm is well-known in the art and is the subject of continuing research and publications.

In response to detecting an object of interest (e.g., an object that has moved within the field of view), the processor can generate one or more control signals that are indicative of the coordinates of the object(s) in the field of view and transmit the control signals to the controller 201, which in turn can cause the movement of the second (movable) detector 109 to acquire higher-resolution image data of that object (i.e., to acquire the second image data). In some implementations, the processor can identify a portion of the image, e.g., a slice of the image, containing the object of interest and can instruct the controller to move the movable detector so as to acquire image data of that slice of the field of view at a higher resolution. By way of example, with reference to FIG. 4B, the processor can identify the slice as the portion of the first image confined between the radial lines T and U and the controller can rotate the movable detector back-and-forth between the respective radial lines in the second image plane so that the detector would acquire image data of that slice of the field of view, and consequently of the object of interest. The processor can then process the image data acquired by the movable image detector to construct an image of that slice of the field of view, and hence of that object of interest, at a resolution (and/or resolution per unit area) greater than that provided by the first image. The processor can then effect the presentation of the first and the second images in displays 209 and 210, respectively.

Furthermore, and as noted above, in some implementations the processor 205 can be configured to track one or more objects that are moving within the field of view and to update the control signals indicative of the position of the moving object within the field of view to cause the movable detector to obtain higher resolution images of the moving object (e.g., a higher-resolution video image). By way of example, FIGS. 6A and 6B schematically depict a vehicle within a field of view (e.g., a parking lot). In such a case, the processor can analyze the first image (e.g., a wide-angle image of the parking lot) to detect the moving vehicle. As noted above, in many embodiments, the processor can utilize appropriate image recognition software to detect the moving vehicle. The processor can then instruct the controller 201 to rotate the rotatable image detector to obtain a higher resolution image of the vehicle. As the vehicle moves, a subsequent image acquired by the first image detector, depicted schematically in FIG. 6B, shows the vehicle in a different location. Upon analyzing the second image, the processor provides updated control signals indicative of the new position of the vehicle to the controller 201 which, in turn, adjusts rotation of the rotatable detector to obtain a higher resolution image of the vehicle in its new position. This process can be repeated so as to track the moving object and provide higher resolution images thereof as it moves through the field of view. The rotatable detector can also capture images at video rates, i.e., at least 30 frames per second, so as to produce a high resolution video image of the vehicle as it moves in the field of view.

In the above tracking application, in some implementations, the processor can analyze the entirety of the first image provided by the first image detector so as to detect at least one object of interest, if any, within the field of view. For subsequent images, the processor can analyze only the relevant portions (i.e., the portions that contain the object(s) of interest). Alternatively, the processor can analyze the entirety of each image provided by the first image detector so as to generate the requisite control signals for application to the controller 201.

In some embodiments, the imaging system 200 allows tracking multiple moving objects and obtaining high resolution images thereof by employing time multiplexing. For example, for two moving objects, the processor 205 can instruct the second (movable or rotatable) image detector 109 to acquire higher resolution images of those objects in an alternating fashion.

In some implementations, the processor can automatically select different portions of the first image, e.g., randomly or according to a predefined pattern, to be generated as the higher resolution second image. For each selection, the processor can transmit the appropriate control signals to the controller to cause the movement (e.g., rotation) of the movable detector for obtaining a higher resolution image of a portion of the field of view that corresponds to that selection.

While the above-described embodiments focus primarily on the use of the present invention in surveillance and object-tracking applications, systems according to the teachings of the present invention can be utilized in a variety of different imaging applications. By way of example, one such exemplary imaging application is high resolution photography. Imaging systems utilizing the teachings of the present invention can be well suited to creating very high resolution photographs, i.e., photographs having an effective resolution on the order of gigapixels or more.

Figure 7:
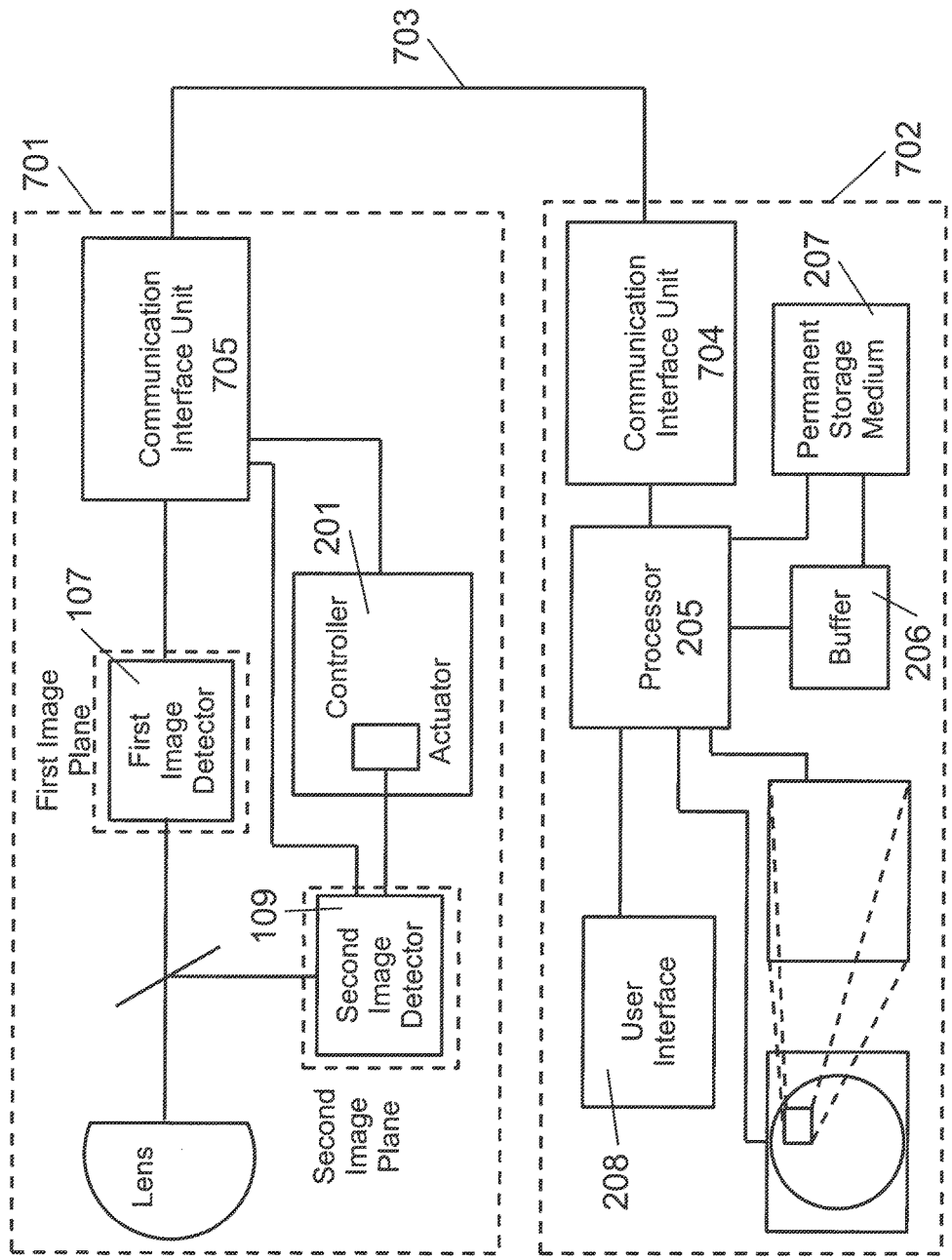
FIG. 7 is a schematic diagram depicting an exemplary embodiment of an imaging system according to the teachings of the present invention in which an optical system is remotely connected to a processing system.

With reference to FIG. 7, in some embodiments, the processor, the display, and the ancillary components can be disposed remotely relative to the controller, and the first and second image detectors. For example, the imaging system can include an image capture portion 701 and a control/processing unit 702 that are remotely located relative to one another and are in communication via a wireless link 703. In this exemplary implementation, the image capture portion includes the first and the second image detectors 107, 109 and the controller 201, and the control/processing unit 702 includes the processor 205, the buffer 206, the storage unit 207, the user interface 208, and other well-known ancillary components (e.g., random access memory, etc) not shown for ease of illustration. A communication interface unit 704 of the control/processing unit 702 can communicate with a respective communication interface unit 705 of the image capture unit 701, e.g., by employing a variety of known protocols, to transmit control signals from the processor to the controller and/or receive the image data acquired by the first and second image detectors 107, 109.

Figure 8:
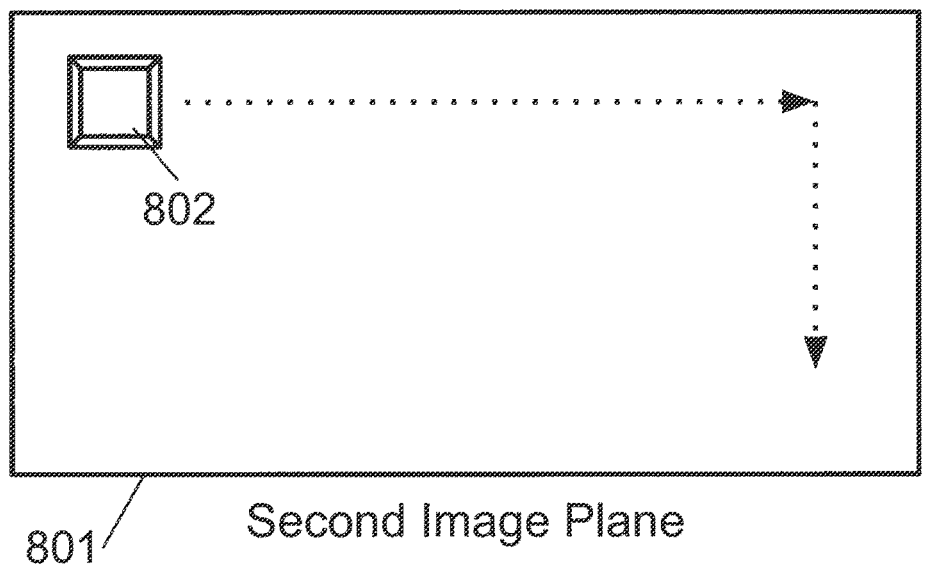
FIG. 8 is a schematic front view of an exemplary embodiment of a movable image detector suitable for use in the practice of the invention in which image detecting elements translate in two dimensions.

In other embodiments, the second (movable) image detector is configured to utilize translation rather than rotation to sample different areas in the second image plane. By way of example, translation of the movable image detector can be accomplished by mounting one or more image detection units on a platform capable of 2-axis motion in the second image plane. FIG. 8 illustrates an exemplary second image plane 801 and image detection unit 802 capable of 2-axis translation within the plane. Similar to the rotational platform described with reference to FIG. 5, a translating platform can be connected to a controller, an actuator, and a processor in order to receive directional commands and transmit captured image data.

Figure 9:
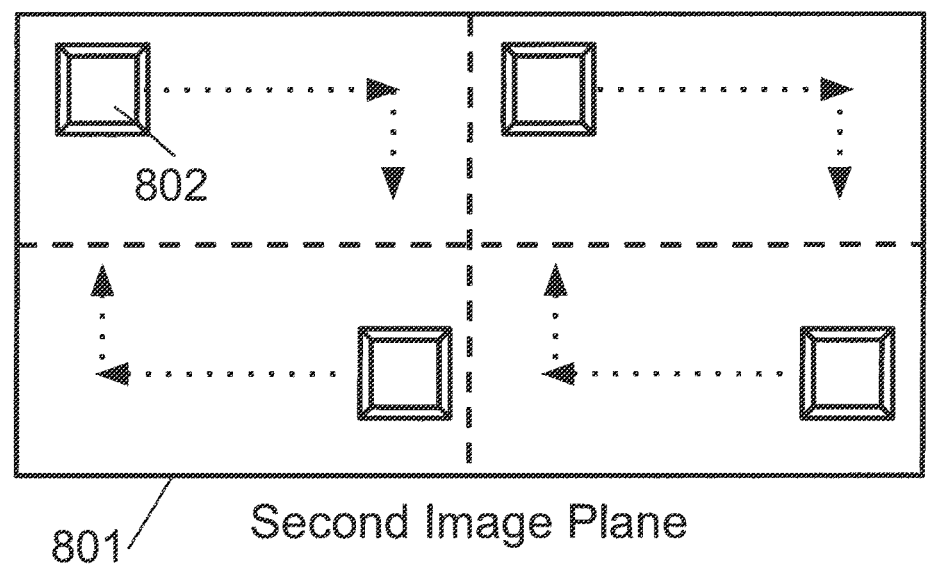
FIG. 9 is a schematic front view of an exemplary embodiment of a movable image detector suitable for use in the practice of the invention in which multiple sets of image detecting elements translate in two dimensions.

FIG. 9 illustrates a variation of the translating platform in which multiple platforms are disposed in the second image plane. In such a configuration, each platform having one or more image detection units 802 is capable of translating across a portion of the second image plane 801. Similar to the rotational configuration described with respect to FIG. 4C, dividing the image plane into sections can allow more rapid imaging and even simultaneous imaging of two or more portions of the second image plane.

Figure 10:
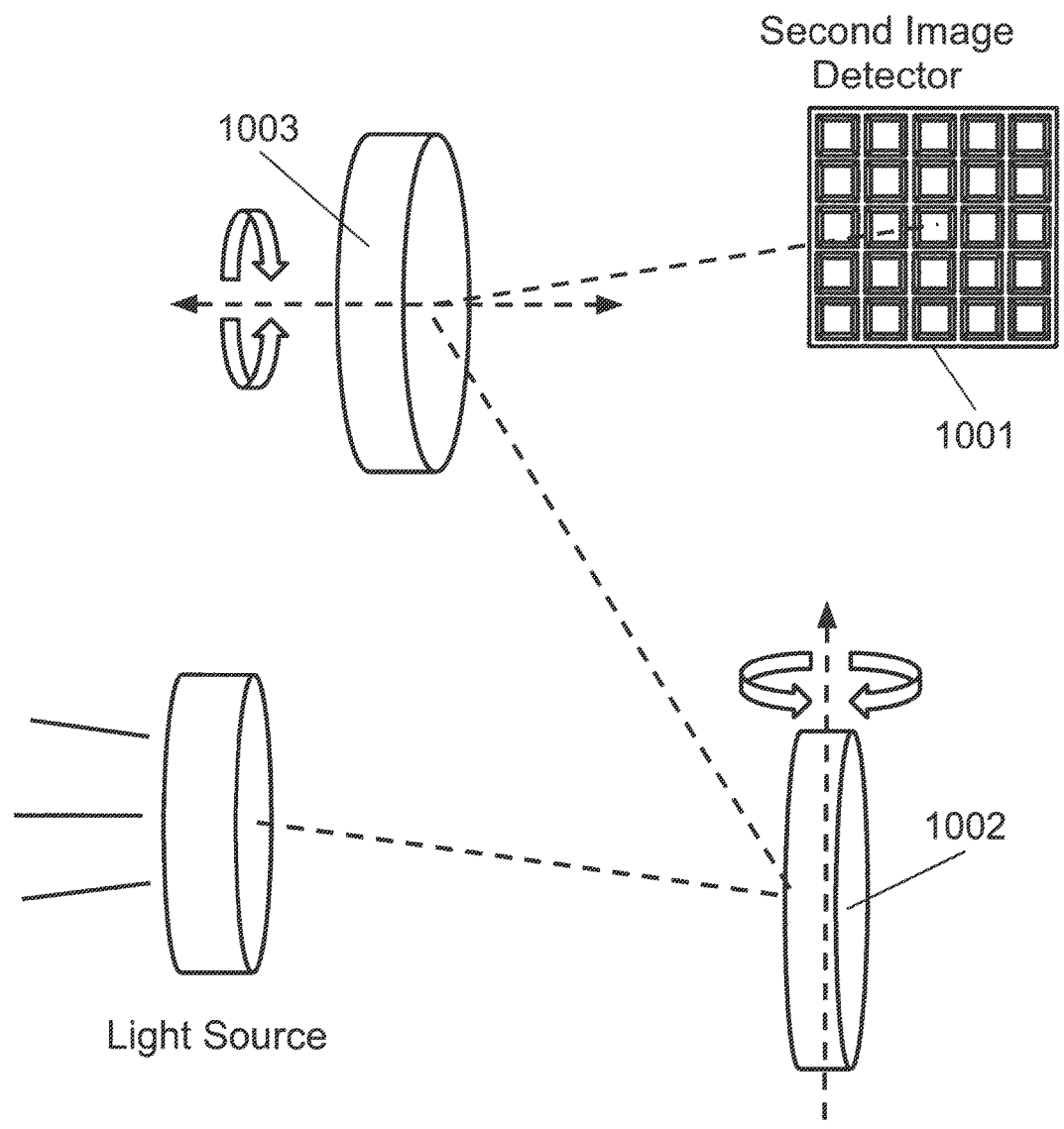
FIG. 10 depicts schematically an exemplary embodiment of an imaging system according to the teachings of the present invention in which movable mirrors are used in combination with a fixed second image detector to allow imaging of different portions of a field of view.

In still other embodiments, rather than employing a movable image detector to acquire image data for generating the higher resolution second image, the second image detector is fixedly coupled to the second image plane and an optical system is employed to scan the light received from the field of view, or at least a portion thereof, over the image detector. By way of example, FIG. 10 shows an exemplary implementation of such a system in which an image detector 1001 comprises a plurality of image detecting elements, such as those discussed above, that are disposed in a fixed array like that depicted in FIG. 3. A first rotatable mirror 1002 is configured to scan received light in a direction normal to its axis of rotation. A second rotatable mirror 1003 has an axis of rotation that is orthogonal to the axis of rotation of the first mirror 1002. As a result, the light received from different portions of the field of view can be scanned over the image detector 1001 using a combination of rotation of the first and second rotatable mirrors 1002, 1003.

In such embodiments, a controller 201 and actuator 202 can be configured to precisely control the angle of rotation for rotatable mirrors 1002 and 1003. Controller 201 can also be configured to relay information related to the positioning of the rotatable mirrors to processor 205 so that processor 205 can correlate each data acquisition by the image detector 1001 with a specific segment of the field of view. Using the acquired image data and location information, processor 205 can then construct a high resolution image of a portion of the field of view.

In yet other embodiments, an image detector 1001 can be used that has a plurality of image detecting elements spanning one linear dimension (e.g., the y-dimension) of the second image plane. In such a configuration, only a single rotatable mirror 1002 can be employed to scan the light received from different portions of the field of view over the detector 1001 along an orthogonal direction (e.g., the x-direction) of the second image plane so as to generate an image of a selected portion of the field of view. In such a configuration, the resolution of the image can be increased in the direction of scanning (e.g., the x-direction).

Figure 11:
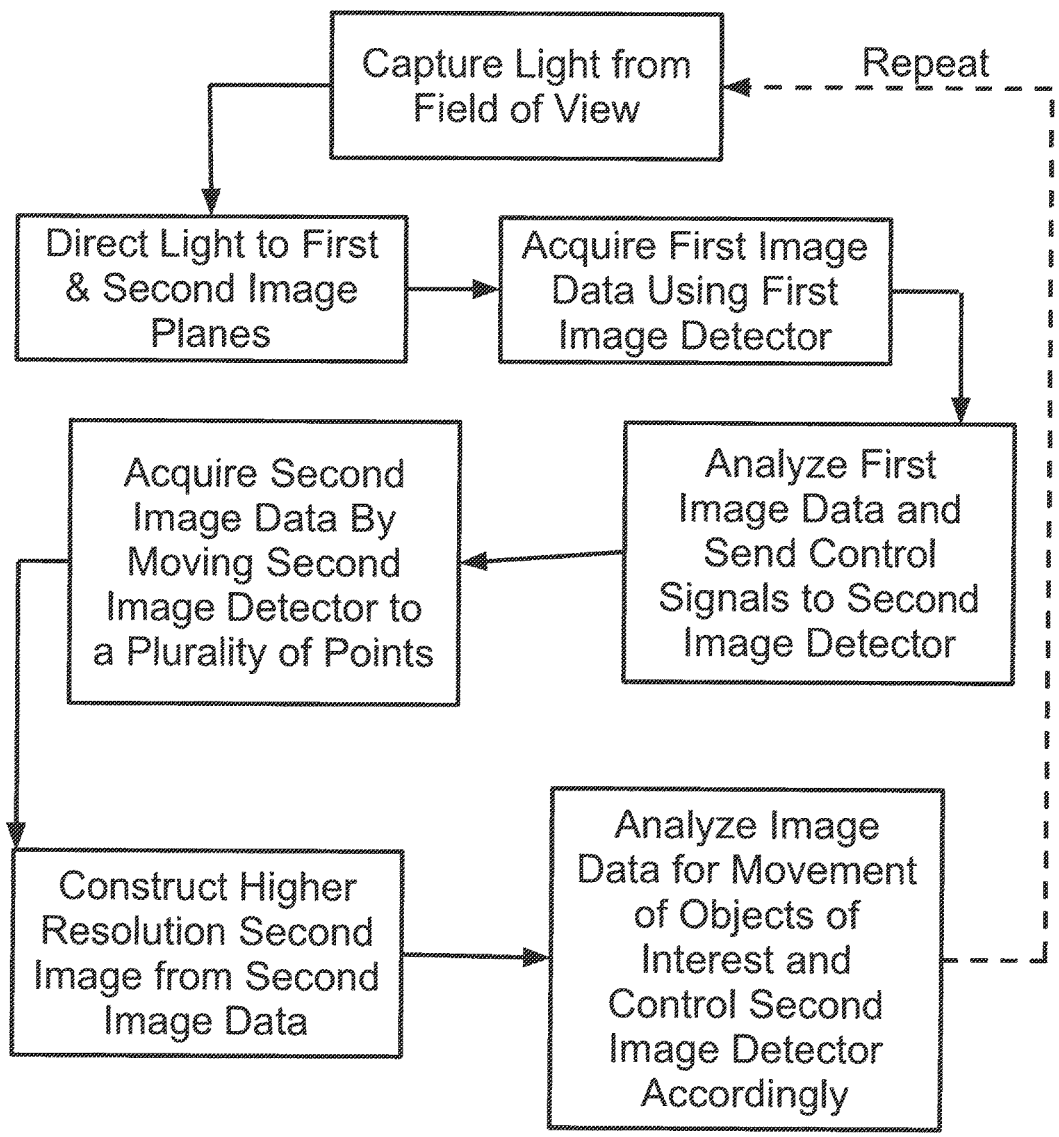
FIG. 11 is a flow diagram depicting various steps of an exemplary embodiment of a method of the present invention.

In other aspects, the present invention provides imaging methods. By way of example, FIG. 11 illustrates a flow chart depicting various steps in an embodiment of a method according to the teachings of the present invention for imaging a field of view. First, light is captured from a field of view and directed to first and second image planes. A first image detector optically (and in many embodiments fixedly) coupled to the first image plane collects first image data of the field of view. The image data can be used to create a first image, for example, by a processor in communication with the image detector. Control signals can be sent to a second, movable image detector to cause it to collect second image data from a plurality of points in the second image plane that correspond to one or more portions of the field of view (e.g., one or more selected portions containing one or more objects of interest) imaged by the first image detector. This second image data can be used to construct a second, higher resolution (and/or resolution per unit area) image of at least a portion of the field of view. In some embodiments, this image data can be analyzed to determine changes in the field of view (e.g., movement of objects of interest) and control signals can be sent to the second, movable image detector to detect light emanating from one or more portions of the field of view. This process can repeated (e.g., at very high rates) to allow, for example, continuous tracking of objects of interest while generating high resolution images thereof One skilled in the art will appreciate further features and advantages of the invention based on the above-described embodiments. Accordingly, the invention is not to be limited by what has been particularly shown and described, except as indicated by the appended claims.

What is claimed is:

1. An imaging system, comprising:
    an optical system configured to collect light from a field of view having one or more objects therein and to direct the collected light to first and second image planes;
    the first image plane, comprising a first image detector that is optically coupled to the first image plane and having a first resolution, wherein the first image detector is configured to detect at least a portion of the directed light and to generate first image data;
    a processor configured to identify at least one object from the one or more objects in the field of view based on the first image data and to select a portion of the field of view having at least one identified object of interest from the one or more objects of interest disposed therein;
    a second image plane, comprising a second movable image detector having a second resolution that is higher than the first resolution optically coupled to the second image plane, wherein the second movable image detector is configured to sample at least a portion of the directed light at the selected portion of the field of view having the at least one identified object and generate second higher resolution image data of the selected portion.

2. The imaging system of claim 1, wherein the processor is in communication with said first and second image detectors so as to receive said first and second image data, said processor processing said first and second image data to generate, respectively, first and second images of the field of view, wherein said second image exhibits a greater resolution than said first image.

3. The imaging system of claim 2, wherein said processor is configured to generate control signals for effecting movement of the second image detector to acquire the second image data corresponding to at least a portion of the first image at a resolution greater than a resolution provided by the first image.

4. The imaging system of claim 3, further comprising a controller electrically coupled to the processor and the second image detector to cause movement of the second image detector in response to control signals generated by the processor.

5. The imaging system of claim 4, wherein the processor analyzes the first image to identify said one or more objects of interest in said field of view and generates control signals for communication to the controller, said controller causing movement of the second image detector in response to the control signals to acquire the second image data corresponding to at least one of said objects at a higher resolution than a respective resolution provided by the first image.

6. The imaging system of claim 4, wherein said controller comprises an actuator coupled to the second image detector to cause its movement based on said control signals.

7. The imaging system of claim 4, wherein said controller adjusts a rate of movement of the second image detector based on an image acquisition time of the second image detector and a desired resolution for the second image data.

8. The imaging system of claim 2, further comprising at least one display in communication with said processor for presenting said first and second images to an observer.

9. The imaging system of claim 1, wherein said second image detector is mounted on a rotatable platform.

10. The imaging system of claim 9, wherein said rotatable platform is rotatable about an optical axis of said optical system.

11. An imaging method, comprising:
collecting light emanating from a field of view;
directing the collected light to a first image plane and a second image plane;
acquiring first image data of the field of view utilizing a first image detector optically coupled to the first image plane;
identifying one or more objects of interest in said field of view based on the first image data;
selecting a portion of the field of view in which at least one of said one or more objects of interest is disposed; and
moving a second image detector optically coupled to the second image plane to the selected portion;
acquiring second image data of the at least one of said objects of interest at a plurality of image points in the selected portion of the field of view at a resolution greater than a resolution provided by the first image data.

12. The method of claim 11, further comprising steps of:
generating a first image from the first image data; and
utilizing said first image to track coordinates of at least one object moving within said field of view.

13. The method of claim 12, further comprising moving the second image detector based on the coordinates of the moving object so as to obtain image data of said object as it moves within said field of view.

14. The method of claim 11, wherein said second image data exhibits a resolution per unit area of at least about 50 megapixels per square inch.

15. The method of claim 11, further comprising processing said first and second image data to generate, respectively, first and second images of the field of view, wherein said second image exhibits a greater resolution than said first image.

16. The method of claim 11, further comprising processing said image data of the moving object acquired by the second image detector to generate a video image of said object as it moves within the field of view.

17. An optical tracking system, comprising:
an optical system configured to collect light from a field of view having one or more objects therein and to direct the collected light to a first image plane and a second image plane;
a first image detector optically coupled to said first image plane to acquire first image data of said field of view;
a second image detector mounted on a movable platform and optically coupled to said second image plane to acquire second image data of said field of view; and
a processor in communication with the image detectors and the platform, said processor being configured to analyze said first image data for moving objects,
wherein when at least one moving object is present in a portion of the field of view, the processor is further configured to apply control signals indicative of coordinates of the moving object to the movable platform so as to cause movement thereof,
wherein the second image detector is configured to acquire image data of the moving object, at a plurality of locations in the portion of the field of view, at a greater resolution than a resolution provided by the first image data.

18. The optical tracking system of claim 17, wherein said processor updates said control signals indicative of the coordinates of the moving object as that object moves in the field of view.

19. The optical tracking system of claim 17, wherein said second image data of the moving object exhibits a resolution per unit area of at least about 50 megapixels per square inch.

20. The imaging system of claim 9, wherein said rotatable platform is configured to rotate continuously as said second image detector acquires second image data.

* * * * *